Patented Dec. 17, 1929

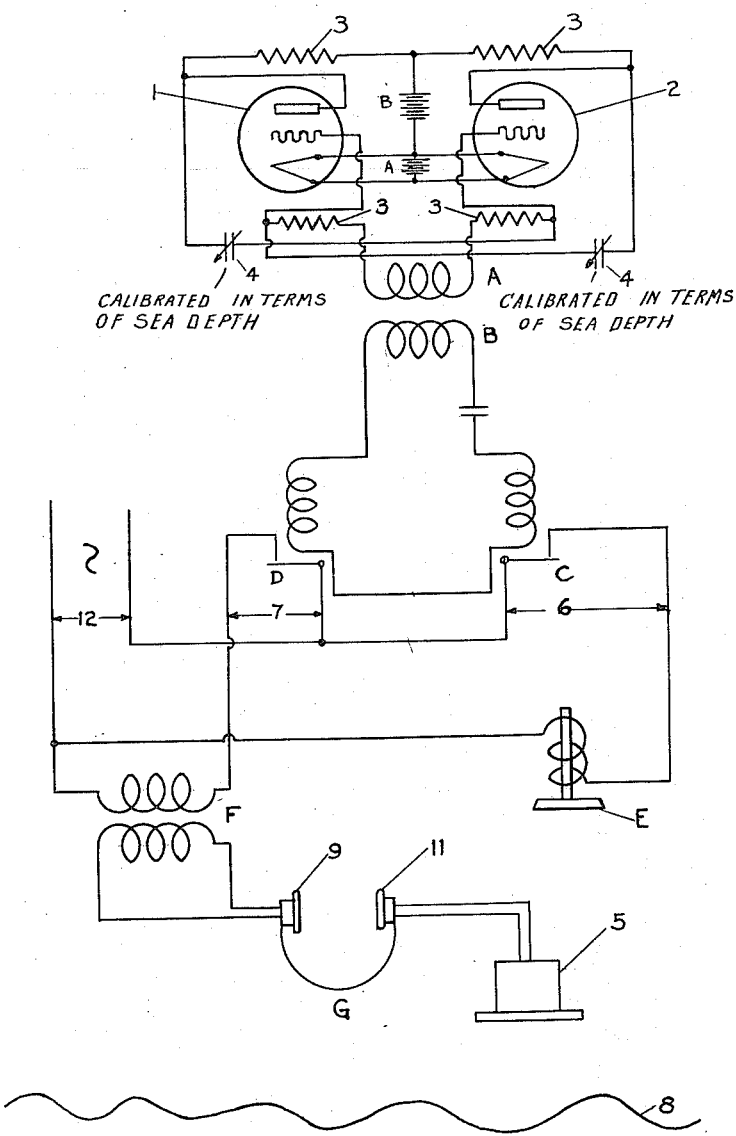

1,739,901

UNITED STATES PATENT OFFICE

WILLIAM F. GRIMES, OF PASADENA, CALIFORNIA

APPARATUS FOR MEASURING DISTANCE

Application filed January 7, 1925. Serial No. 1,134.

(GRANTED UNDER THE ACT OF MARCH 3, 1883, AS AMENDED APRIL 30, 1928; 370 O. G. 757)

My invention relates broadly to a system for determining ranges by means of sound waves but more particularly to such a system when operated to determine sea depths and has for an object the elimination of mechanical control of the signals used and the control of said signals electrically.

A further object is to provide a simple and efficient system which will occupy a small space and which can be operated by one not skilled in the art.

With these and other objects in view my invention can be best understood by reference to the accompanying drawing which is a diagrammatic illustration of my invention and in which circuit "A" may be any conventional oscillating circuit, the selected constants of which are such that there is produced an alternating current of a very low and constant frequency. The circuit shown has been selected because of its simplicity and in it use has been made of vacuum tubes (1) and (2), inductances or resistances (3), and variable condensers (4), connected in a conventional form. Circuit "A" is inductively coupled to circuit "B", thereby producing a circulating current in circuit "B" of a desired frequency. The circulating current in circuit "B" flows through the two polarized relays "C" and "D", said polarized relays being so connected that one will function on the positive lobe and the other on the negative lobe of the alternating current circuit "B". Polarized relay "C" serves to close the exciting circuit (6) for the oscillator or noise maker "E" the frequency of which is constant. "E" can be any suitable oscillator operated by a source of alternating current connected to the wires (12) and which is capable of producing a sound which may be reflected back as an echo to the microphone (5) from reflecting surface (8). Polarized relay "D" serves to close the circuit (7) through the transformer "F" which in turn will produce a signal in telephone receiver (9) of the two-phone head piece "G". The second telephone receiver (11) is connected directly to the microphone (5).

The operation of my invention is substantially as follows:

With circuit "A" tuned to a particular frequency signals will be sent out from oscillator "E" at certain definite intervals of time, the time element being controlled electrically rather than mechanically as has been the practice heretofore. The signals so sent return from the reflecting surface (8) as echoes and are picked up by microphone (5). Microphone (5) may be any type suitable for converting sound energy into electrical energy. The echoes so collected and converted into electrical energy are transferred to receiver (11). At intervals halfway between the groups of outgoing signals, a second signal is made in receiver (9) through the medium of the contacts of the polarized relay "D" and the transformer "F". When the frequency of circuit "A" is so adjusted that the echo from the reflecting surface (8) is received in receiver (11) at exactly the same instant that a direct electrical signal from "F" is received in receiver (9), then, the distance the sound has traveled from "E" to the reflecting surface (8) can be readily calculated.

I prefer to calibrate the condensers 4 in terms of sea depth. When this is done the procedure for measuring the depth of the water at a given locality, is as follows: With the device under operation, the operator varies the frequency of the controlling current through movement of the dials of the condensers 4 over the entire range of the instrument, thus passing through a number of binaural centers. Near one end of the range of the condensers there will be a point at which the binaural centers stop. This then is the point at which the signal in the telephone 9 coincides with the next preceding signal transmitted by the transmitter E. It is to be understood that there are other methods of determining this coincidence but in practice I have found this method the most simple for the operators to accomplish.

It is understood that the above description and accompanying drawings disclose only the preferred embodiment of my invention and that various minor changes in details of construction, proportion, and arrangement of parts may be resorted to within the scope of the appended claims and without sacrificing any of the advantages of my invention.

The invention herein described may be manufactured and used by or for the Government of the United States for governmental purposes without the payment to me of any royalty thereon or therefor.

Having described my invention I claim:—

1. In a distance measuring device having a sonic transmitter and a source of power therefor, a sonic receiver and a double telephone head receiver, one telephone receiver of which is coupled to the source of power and the other telephone receiver of which is coupled to the sonic receiver circuit, the combination of electrical means within the sonic transmitter circuit for making and breaking the said circuit at predetermined intervals, and electrical means for making and breaking the coupling between the source of power and the telephone receiver coupled thereto, each of said means consisting of a polarized relay coupled to a common source of alternating current power.

2. In a distance measuring device having a sonic transmitter and a source of power therefor, a sonic receiver and a double telephone head receiver, one telephone receiver of which is coupled to the source of power and the other telephone receiver of which is coupled to the sonic receiver circuit, the combination of electrical means within the sonic transmitter circuit for making and breaking the said circuit at predetermined intervals, and electrical means for making an breaking the coupling between the source of power and the telephone receiver coupled thereto, each of said means consisting of a polarized relay coupled to a common source of alternating current power and arranged to operate on alternate half cycles of an alternating current supplied by said common source of alternating current power.

3. In a distance measuring device having a sonic transmitter and a source of power therefor, a sonic receiver and a double telephone head receiver, one telephone receiver of which is coupled to the source of power and the other telephone receiver of which is coupled to the sonic receiver circuit, the combination of electrical means within the sonic transmitter circuit for making and breaking the said circuit at predetermined intervals, and electrical means for making and breaking the coupling between the sonic transmitter circuit and the telephone coupled thereto, each of said means consisting of a polarized relay having windings connected in series with each other and arranged to operate on alternate half cycles of an alternating current, and a secondary of a transformer in series with the relays, the primary of the transformer constituting the output circuit of a vacuum tube oscillator.

4. In a distance measuring device having a sonic transmitter and a source of power therefor, a sonic receiver and a double telephone head receiver, one telephone receiver of which is coupled to the source of power and the other telephone receiver of which is coupled to the sonic receiver circuit, the combination of electrical means within the sonic transmitter circuit for making and breaking the said circuit at predetermined intervals, and electrical means for making and breaking the coupling between the sonic transmitter circuit and the telephone receiver coupled thereto, each of said means consisting of a polarized relay having windings connected in series with each other and arranged to operate on alternate half cycles of an alternating current, a secondary of a transformer in series with the relays. the primary of the transformer constituting the output circuit of a vacuum tube oscillator, and means for tuning the output circuit of the vacuum tube oscillator, said means constituting the control of the interval between the transmitted signals.

5. In a distance measuring device, a source of variable alternating current, means for varying the frequency of said source, including an indicator and a scale graduated in terms of distance, a pair of head receivers, an electro responsive compressional wave receiver, connections between one of said head receivers and said compressional wave receiver, an electro-responsive compressional wave transmitter, a second source of alternating current and connections between the latter and said transmitter and the other of the pair of head receivers, and electro-responsive means operated from said first named source of current for supplying current to said second receiver and to said transmitter through alternate half cycles of said first named source.

6. A distance measuring device including a sonic transmitter, a source of power therefor, a sonic receiver, a double receiver head telephone, a source of alternating current, electrical means associated with said alternating current for connecting said sonic transmitter to said source of power during predetermined intervals dependent upon the frequency of said alternating current, separate electrical means for connecting one receiver of said head telephone to said source of power during other predetermined intervals, and means for connecting the other receiver of said head telephone to the sonic receiver.

7. A distance measuring device including a sonic transmitter, a source of power therefor, a sonic receiver, a double receiver head telephone, a source of alternating current of variable frequency, electrical means associated with said alternating current for connecting said sonic transmitter to said source of power during predetermined intervals dependent upon the frequency of said alternating current, separate electrical means for connecting one receiver of said head telephone to said source of power during other predetermined intervals, and means for connecting the other receiver of said head telephone to the sonic receiver.

8. A distance measuring device including a sonic transmitter, a source of power therefor, a sonic receiver, a double receiver head telephone, a source of alternating current of variable frequency, electrical means associated with said alternating current for connecting said sonic transmitter to said source of power during predetermined intervals, dependent upon the frequency of said alternating current, separate electrical means associated with said alternating current for connecting one receiver of said head telephone to said source of power during other predetermined intervals dependent upon the frequency of said alternating current, and means for connecting the other receiver of said telephone to said sonic receiver.

WILLIAM F. GRIMES.